(No Model.)
J. W. HOGUE.
WATER CLOSET.
No. 429,853. Patented June 10, 1890.
Fig. 1.
Fig. 2.
on line x-x
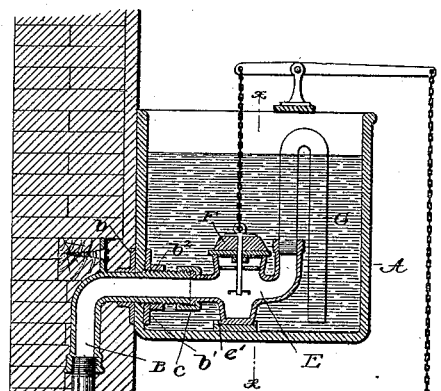
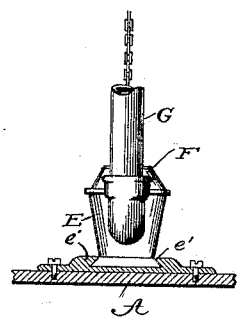
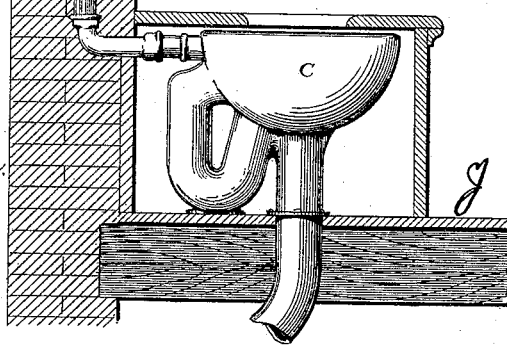
Attest
W. W. Mortimer
H. R. Kennedy.
Inventor:
J. W. Hogue
By his Atty,
Phil. T. Dodge.

UNITED STATES PATENT OFFICE.

JAMES W. HOGUE, OF WASHINGTON, DISTRICT OF COLUMBIA, ASSIGNOR OF ONE-HALF TO FRANK. T. HOPKINS, OF SAME PLACE.

WATER-CLOSET.

SPECIFICATION forming part of Letters Patent No. 429,853, dated June 10, 1890.

Application filed July 9, 1889. Serial No. 316,948. (No model.)

*To all whom it may concern:*

Be it known that I, JAMES W. HOGUE, of Washington, in the District of Columbia, have invented certain Improvements in Water-Closets, of which the following is a specification.

My invention relates to that class of flushing-closets in which the water is delivered by a siphon from an overhead tank or cistern, the siphoning action being initiated by the momentary admission of water through a valve directly into the discharge-pipe. The parts are commonly constructed in such manner that the pipe must be applied after the tank is in position, that the connection of the parts is a troublesome operation, and that the pipe must be exposed to view.

The aim of my invention is to overcome these difficulties, permit the concealment of the pipe within the wall, render the pipe available as a support for the tank, and facilitate the connection of the parts; and to this end the improvement consists in combining with the tank and valve a discharge-pipe leading through the rear side of the tank, the parts being constructed as hereinafter described.

Figure 1 is a vertical section through a tank constructed on my plan in operative position; Fig. 2, a cross-section of the same on the line *x x*, illustrating the manner in which the valve is secured in place.

A represents the tank, and B the discharge-pipe leading from its side to the bowl or hopper C of the closet. The pipe, instead of being carried away from the wall at its upper end and passed through the bottom of the tank, as usual, is seated or embedded strongly in the wall and concealed from sight and protected from injury. The upper end of the pipe is projected horizontally beyond the surface of the wall and through the side of the tank, which is preferably made, as shown, with a flat vertical side to fit closely against the wall. I form the pipe with a collar *b* to fit against the outside of the tank, and on the inside of the tank I apply to the threaded end of the pipe a washer *b'*, of rubber or other suitable material, and a nut $b^2$, thus producing a tight joint around the pipe, and at the same time fastening the tank snugly to its plate, so that it will be sustained by the pipe.

E represents a valve body or shell having at the top an opening closed by the weighted valve F; on one side an upturned neck to receive and sustain the siphon G, and on the other side a horizontal neck, which is firmly connected by collar *c* to the end of the discharge-pipe. The valve-body is seated at its base between and is held down to its place by lips *e'*, formed on or secured to the bottom of the tank.

In assembling the parts the body is shoved horizontally to its place between the lips, and is then secured in place by the application of the coupling. The valve proper may be lifted by a chain and lever, as shown in the drawings, or in any other suitable manner. When the valve is raised, water is admitted directly into the shell, and thence into the downpipe in quantity sufficient to induce the action of the siphon, although the valve may be instantly closed again.

It is to be noted that my construction permits the use of strong and cheap iron pipe, suitable to sustain wholly or in great part the weight of the tank, that it permits the pipe to be wholly concealed from view, so that the expense of ornamentation is avoided and a neater appearance secured, and that it admits of the parts being assembled with less labor and more quickly than when they are constructed, in the usual manner, with connections through the bottom of the tank.

Having described my invention, what I claim is—

1. In a water-closet, a flushing-pipe embedded in and projected at its upper end beyond a wall, in combination with a flushing-tank having its vertical side seated over and around the end of the pipe and secured thereon, substantially as shown, whereby the pipe is concealed from sight, protected from injury, and caused to sustain the tank in position.

2. In a water-closet, the flushing-tank with ribs or lips *e'* therein, in combination with the valve-body engaged with said lips, and the discharge-pipe fastened horizontally through the side of the tank and coupled to the valve-body, whereby the body is held securely in position.

3. The water-closet flushing-tank provided with an opening in its side wall, in combination with an upright pipe having its upper end threaded, extended horizontally through the opening in the tank and secured by inside and outside collars, and an internal valve attached to the pipe, whereby the pipe is caused to serve not only as a conductor for the water, but also as a support for the tank and as a means of keeping the valve in place.

In testimony whereof I hereunto set my hand, this 7th day of June, 1889, in the presence of two attesting witnesses.

JAMES W. HOGUE.

Witnesses:
FRANK. T. HOPKINS,
W. R. KENNEDY.